United States Patent Office 3,247,912
Patented Apr. 26, 1966

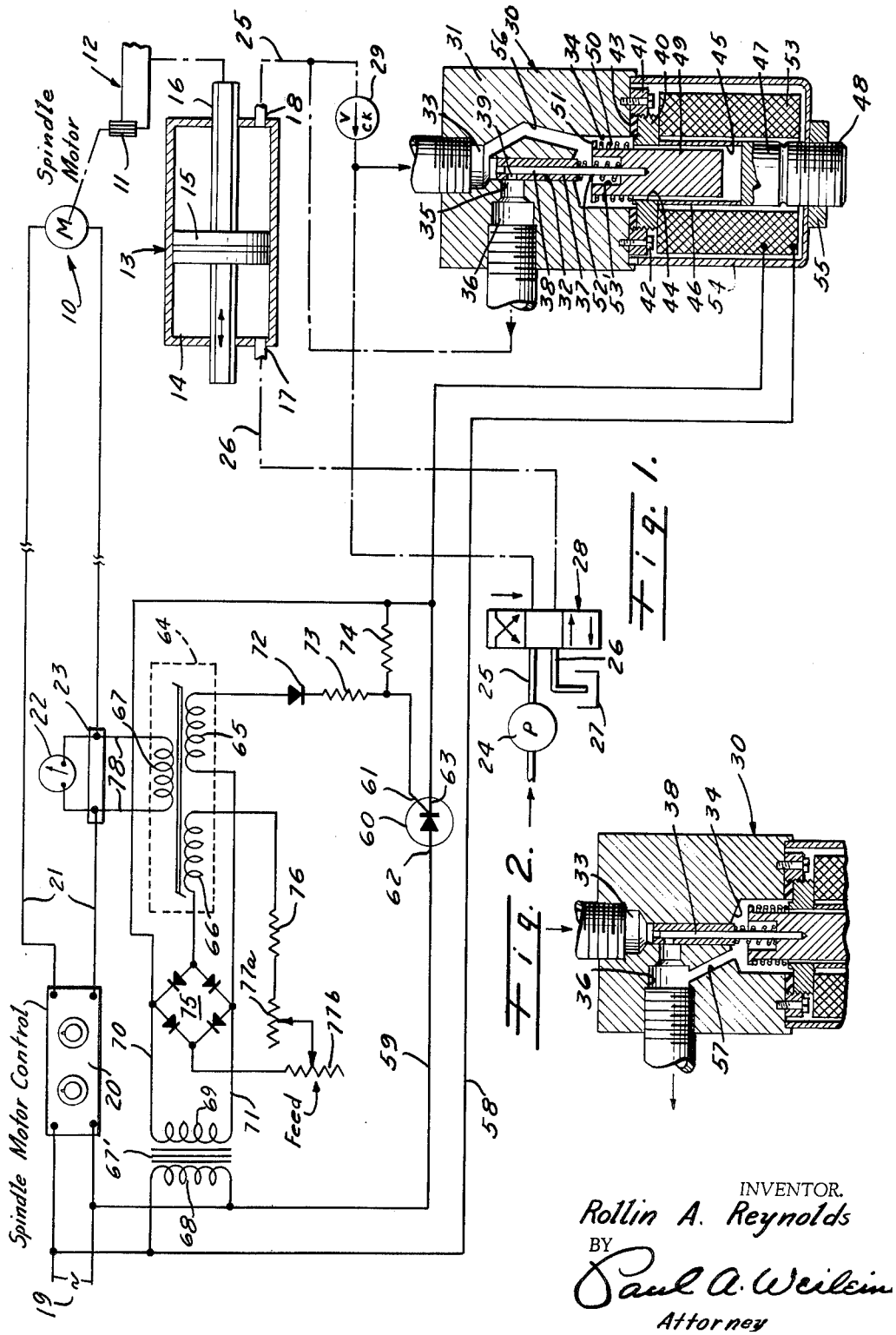

3,247,912
ELECTRO-HYDRAULIC CONTROL FOR
MACHINE TOOLS
Rollin A. Reynolds, Palos Verdes, Calif., assignor to
Dyna Systems, Inc., Torrance, Calif., a corporation of
California
Filed Mar. 19, 1963, Ser. No. 266,423
11 Claims. (Cl. 173—7)

The present invention relates generally to improvements in the art of removing material from a work piece or the like by means of a cutting tool, and is more particularly concerned with electro-hydraulic control means for machine tools and the like employing fluid pressure actuated power devices for feeding the tool or work piece into working relationship.

The present invention has wide application and is especially useful in connection with machine tool equipment such as utilized for drilling, milling and similar procedures in which the materials are removed by a cutting tool operating on a work piece. Such equipment is generally characterized by the use of a tool having a cutting edge which is linearly or rotatably relatively moved over the workpiece, and wherein, by the application of suitable pressure, is caused to operate at a predetermined cutting depth and remove the material usually in the form of chips.

It is one object of the present invention to provide improved control for machine tools and the like of the above noted type, and in which a fluid pressure actuated power device is utilized for feeding the work piece or tool into working relationship. In its broad concept, the invention automatically controls and maintains the most effective working relationship between the tool and work piece, thus permitting removal of the greatest amount of material without exceeding safe operating limits of the tool, or operating it under conditions which would have an undesirable damaging effect on the tool.

It is a further object to provide improved electrohydraulic control for machine tool feeding means of the fluid actuated type, which includes a unique servo regulating valve for control of the fluid supplied to the feeding means, and wherein the valve position is variably controlled by electro-magnetic actuating means in response to a separate signal generated in accordance with the working load imposed on the machine tool, and which automatically regulates the working load to obtain maximum efficiency of operation.

A further object of the invention is to provide improved control for machine tools which utilize different types of power devices, for example, an electric motor for feeding a spindle and a fluid actuated device for feeding the work material; and wherein the control of the fluid actuated power device may be coordinated to operate in response to torque characteristics of the electric motor power means.

Another object is to provide a unique control system for fluid power means, which utilizes a saturable core reactor for controlling a gating device in an energizing circuit for a servo regulating valve for controlling fluid supply to the fluid actuated power device.

Still another object is the provision of a novel improved electro-magnetically actuated servo regulating valve having a spring mounted valve member assembly which is tuned to resonate and vibrate at a frequency induced by the frequency of the energizing current therefor.

Further objects of the invention will be brought out in the following part of the specification wherein detailed description is for the purpose of fully disclosing the invention without placing limitations thereon.

Referring to the accompanying drawings, which are for illustrative purposes only:

FIG. 1 is a schematic wiring diagram of control embodying the concepts of the present invention, the servo regulating valve being disclosed in section to more clearly indicate the cooperative relationship of its component parts; and FIG. 2 is a fragmentary sectional view showing a modified arrangement of the valve means for effecting a different inherent mode of operation.

Referring more specifically to the drawings, the basic concept of the control of the present invention will be considered and described in connection with a machine tool of the type utilizing several power devices, one of which comprises an electric motor 10 which may be considered as constituting the power means for driving a spindle for rotating a connected tool 11 such as a milling cutter as conventionally used for removing material from a work piece as generally indicated at 12. The other power device is shown as comprising a fluid actuated power means as generally indicated at 13 and shown for illustrative purposes as including a cylinder having a piston 15 reciprocable therein, this cylinder being connected to a power delivery rod 16 by means of which movements of the piston may be transmitted through a connection to the work piece 12 and through such movement the tool and work piece brought into working and non-working relationship through feeding and non-feeding movements. The ends of the cylinder are respectively provided with fluid connections 17 and 18 to which a fluid source may be reversibly connected to drive the piston in one or the other directions of its movement. Although the fluid power means has been in the present instance shown as being connected to move the work piece, the invention is not to be thus limited, as it is conceivable that the movement of the piston 15 may be transmitted, as for example in the case of a drill press, to the tool so as to move it with feeding and non-feeding movements with respect to the work piece.

The electrical power supply is from an alternating current power source 19 which connects through suitable motor control apparatus, as generally indicated at 20, to an output circuit 21 connected with the terminals of the spindle motor 10. The control is usually arranged to provide a rectified output to the motor, and the output circuit 21 is shown as being provided with a torque meter 22 connected across a shunt 23 in one of the output circuit conductors, whereby a torque indication may be obtained for use in adjusting the control of the spindle motor, and it also serves as a signal generating means for use in controlling the fluid power device in a manner to be hereinafter described.

Any suitable source of pressurized fluid may be utilized for actuating the fluid actuated power device 13. In the present instance, the power source is shown as comprising a fluid pump 24 which is connected to deliver fluid under pressure to an output distribution conduit 25 from which it is distributed to a point of use and then returned through a return conduit 26 into a storage vessel or waste sump 27. More specifically, the conduit 25 is shown as being connected with fluid connection 18 of the power device 13, while conduit 26 is connected with the fluid connection 17. Provision is made, however, for reversing the pressure and return fluid connections with respect to the power device 13 by means of a reversing valve as generally indicated by the numeral 28 as being in a neutral position. Thus, by moving this valve in one direction, the pressure supply of fluid will be connected to the connection 17, whereas in the other operative position of the valve 28, the pressure supply will be connected to the fluid connection 18 of the power device. As shown, the conduit 25 is provided with a check valve 29 which is arranged to permit fluid flow from the connection 18 but oppose fluid flow towards the fluid connection 18. As thus arranged, actuation of the reversing valve 28 so as to apply fluid pressure to the fluid connection 17 will operate directly to move the piston 15 in a direction to carry the work piece 12 away from the tool 11. Movement of the valve 28 to its other position, which may be considered as the feeding position with respect to the work piece 12, will in the arrangement thus far described be ineffectual to move the piston 15 in the feeding direction.

For controlling the movement of the piston 15 of the power device 13 in a feeding direction, provision is made for by-passing the check valve 29 through a servo regulating valve, as generally indicated by the numeral 30.

The servo regulating valve comprises a body 31 of aluminum or other suitable non-magnetic material, which is provided with an internal bore 32 which interconnects at one end with an inlet port 33 and at its other end with a cavity 34. Adjacent the end which is in communication with the inlet port, the bore 32 has a branch wall opening 35 which communicates with an outlet port 36. The bore 32 is fitted with a tubular sleeve 37 which forms a liner for the bore and a support for an elongate valve pin 38 therein. The innermost end of the valve pin is in valving relation with a constricted opening 39 in the side wall of the sleeve, this opening being in communication with the outlet port 36 and serving to provide a valved flow passage between the inlet and outlet ports, when the valve pin is in opened valving position.

The cavity 34 is open in the lower face of the body 31, this opening being sealed by means of an annular bushing 40 of soft iron or other suitable material for providing a magnetic flow path, this bushing at its periphery being in threaded engagement with an attaching collar 41 which is secured to the body 31 as by appropriate holding screws 42. In its secured position, the outer periphery of the annular bushing engages a ring seal 43.

The cavity 34 is in communication through a central opening 44 of the bushing with a closed elongate, cylindrical compartment 45 which is formed by a spacing tube 46 of nickel alloy or other generally non-magnetic material which is welded at one end to the bushing 40 and at its other to an end closure extension 47 of soft iron, this extension having a threaded outer end 48.

An elongate soft iron armature 49 is spring supported for axial movement within the cavity 34 and the compartment 45 by means of a compression coiled spring 50 which extends between the adjacent surface of the bushing 40 and an outwardly extending projecting end flange 51 at the upper end of the armature. The upper end of the armature is connected with the lowermost end of the valve pin 38, and a compression coil spring 52 is provided around the valve pin, one end of this spring being seated in an end recess 53' of the armature and the other end being in abutting engagement with the adjacent end of the tubular sleeve 37. An energizing actuating coil 53 is mounted in surrounding relation to the spacing tube 46 and end closure 47, this coil being retained in operative position by means of a cup-like casing 54 of soft iron, the bottom of this cup being apertured to receive the threaded outer end 48 therethrough. A retaining nut 55 secures the casing with its brim portion in engagement with the body 31 at the periphery of the attaching collar 41.

The springs 50 and 52 are so selected that they will resiliently support the valve pin and connected armature in a normal position in which the uppermost end of the valve pin will be in valve closed relation with respect to the opening 39. Moreover, the springs are so selected that the mass comprised by the valve pin and connected armature will resonate and axially vibrate at a predetermined frequency, namely, the frequency of the energizing signal for the actuating coil 53. By providing a vibrating valve structure, the sensitivity of the servo regulator valve is increased to such an extent that it may be used for the intended purpose of the control of the fluid power device 13 in a manner hereinafter to be described. Depending upon the extent of energization of the actuating coil 53, the regulating and modulating valve control positions of the valve pin may be made to correspond with an external control signal.

In the embodiment of the servo regulating valve, as shown in FIG. 1, an equalizing duct passage 56 connects the inlet port 33 with the cavity 34. The valve pin 38 is thus balanced with respect to the inlet fluid pressure, since this pressure acts on similar areas in opposite directions with respect to the valve pin.

In the modified arrangement shown in FIG. 2, the structure is the same as that shown in the arrangement of FIG. 1, except that instead of the duct passageway 56, a duct passageway 57 is arranged to interconnect the outlet port 36 with the cavity 34. This modifies the valve operation and makes the valve self-regulating in that, when inlet pressure is applied at the inlet port, this pressure acts on the exposed adjacent end of the valve pin 38 and immediately forces it to fully open position, with the result that the piston 15 acts rapidly to carry the work piece and tool into working relationship. However, as soon as the tool and work piece engage, back pressure will be built up at the outlet port, and with this pressure acting on both ends of the valve pin, the valve pin will be in a balanced position and move under the action of its spring suspension to its normal closed position. From this point, the automatic regulation of the valve pin will be effected through the electrical control portion which will now be described.

The actuating coil 53 of the servo regulating valve is energized from the power source 19 through circuit conductors 58 and 59 one of which, in this instance conductor 59, contains an electronic switching device 60, such as commercially referred to as a silicon controlled rectifier. This device has a control or a gate electrode 61 by means of which current flow may be controlled from an anode electrode 62 to a cathode electrode 63 in a manner well known in the electronic art.

Control of the gating electrode 61 is obtained from a network by means of a saturable reactor 64 containing a magnetic core of the square loop type with which there is associated a gate winding 65, a bias winding 66, and a separate control winding 67.

This control network is energized through an isolation transformer 67', this transformer having a primary winding 68 which is connected to the alternating current power source 19, and a secondary winding 69 having end terminals respectively connected with conductors 70 and 71 to form a gate control circuit. The conductor 70 connects with conductor 59, while conductor 71 is connected with the gate control electrode 61 through gate control winding 65, a diode 72 and a load-limiting resistor 73. A gate voltage-limiting resistor 74 is connected between the gate controlling electrode 61 and the cathode electrode 63 of the electronic switching device. A gate firing signal is thus obtained from the winding 65, and when the core of the reactor is unsaturated, this winding forms a relatively high impedance to the gate signal so that only a small voltage is developed across the gate voltage-limiting resistor 74. However, when the core saturates, the decreased impedance permits a large voltage to appear at the gate causing it to fire. The resistor 73 limits gate current, while the diode 72 prevents reverse voltage on the gate as well as reverse current to the winding 65, which might produce undesirable reset of the reactor core.

The bias winding 66 is connected into the output circuit of a bridge rectifier 75 which has its input connected to conductors 70 and 71. The energizing circuit of winding 66 contains a resistor 76 and feed adjusting resistors 77a and 77b.

The bias winding 66 is connected so as to magnetize the reactor core in a direction opposite that of winding 65. The bias winding thus operates in a reset mode by controlling the reset voltage during the negative half cycle. The setting of the feed resistors 77a and 77b determines the amount of reset of the core during the negative half cycle, thus determining the phase angle of conduction of the electronic switching device 60 during the positive half cycle. As thus arranged, in conjunction with the energizing circuit of the actuating coil 53, the setting of these resistors determines the feeding operation of the fluid actuated power device 13 and consequently has an effect upon the tool loading.

The control winding 67 is connected to a feedback circuit 78 which is connected across the terminals of the shunt 23 of the torque meter or other load responsive means which will detect the current flow in the energizing circuit of the spindle motor 10. The winding 67 is thus operated in the magnetomotive force mode in response to variations in the torque of the spindle motor and determines the core flux level and the concomitant firing angle.

The control of the present invention thus permits the cooperative association of an electric motor and fluid power device in machine tools in such a manner that the feeding movement and working load may be coordinated in a flexible and stable manner to obtain a preset loading which will cause the tool to operate within safe limits, and yet produce maximum cutting operation.

Various modifications may suggest themselves to those skilled in the art without departing from the spirit of my invention, and hence, I do not wish to be restricted to the specific forms shown or the uses mentioned, except to the extent indicated in the appended claims.

I claim:

1. Electro-hydraulic control for machine tools, comprising: a workpiece; a tool operative on the workpiece; a source of fluid pressure; fluid cylinder power means selectively energizable to relatively move the work piece and tool for feeding and non-feeding operations; a reversing valve selectively operable to connect said power means with said source for feeding and non-feeding operations; servo regulator means including a resiliently suspended valve member controlling the fluid supply to said power means from said source during its connection for a feeding operation; a tool actuating motor having an energizing circuit; means in said energizing circuit for generating a pulsing signal in accordance with the value of the load current of said motor; and electromagnetic means for adjustably positioning said valve member in accordance with said signal.

2. Electro-hydraulic control for machine tools, comprising: a workpiece; a tool operative on the workpiece; a source of fluid pressure; fluid cylinder power means selectively energizable to relatively move the work piece and tool for feeding and non-feeding operations; a reversing valve selectively operable to connect said power means with said source for feeding and non-feeding operations; servo regulator means including a valve member controlling the fluid supplied to said power means from said source during its connection for a feeding operation; a tool actuating motor having an energizing circuit; means in said energizing circuit for generating a signal in accordance with the value of the load current of said motor; and means for adjustably positioning said valve member including a gating element controlled by said signal.

3. A control system for a fluid pressure actuated power device for machine tools and the like, comprising: a source of fluid pressure having connections with said device; a servo regulator including a valve member for controlling the supply of fluid from said fluid source to said power device through said connections, and actuating means for adjustably moving said valve including an energizable coil; a voltage source connected to said coil through a circuit containing an electronic gating device for determining current flow to said coil, said device having a gate control electrode; a saturable core reactor having a winding coupled in circuit with a diode between said voltage source and said control electrode; a bias winding connected with said voltage source through unidirectional conducting devices in circuit with an adjusting resistor; and a control winding for augmenting the effect of said bias winding in response to a separately generated signal.

4. Electro-hydraulic control means for machine tools, comprising: a workpiece; a tool operative on the workpiece; a fluid pressure actuated power device for relatively moving the work piece and tool; a source of fluid pressure including a fluid flow passage connected to said device; valve means including a valve member adjustably operable between closed and open positions to regulate fluid flow through said passage; an armature having an operative connection with said valve member; means for resiliently supporting the weight of said armature and mechanically balancing said armature and connected valve member for movement toward a closed position; an actuating coil operatively associated with said armature energizable to regulate the operating position of said valve; and means for energizing said actuating coil with a pulsing electrical signal varied in accordance with the tool load.

5. Electro-hydraulic control means for machine tools, comprising: a workpiece; a tool operative on the workpiece; a fluid pressure actuated power device for relatively moving the work piece and tool; a source of fluid pressure including a fluid flow passage connecting said source with said device, said passage having inlet and outlet ports; valve means including a valve member adjustably operable between closed and open positions to regulate fluid flow through said passage; an armature having an operative connection with said valve member; means normally supporting and biasing said armature and connected valve member for movement towards a valve closed position, but said valve being initially operable upon application of fluid pressure to said inlet port from said closed position to an open position; an actuating coil operatively associated with said armature energizable to regulate the operating position of said valve in response to variations in a tool load torque condition; and means for closing the valve from an opened position upon the occurrence of increased fluid back pressure at the outlet port.

6. Electro-hydraulic control means for machine tools, comprising: a workpiece; a tool operative on the workpiece; a fluid pressure actuating power device for relatively moving the work piece and tool; a source of fluid pressure including a fluid flow passage connecting said source with said device, said passage having inlet and outlet ports; valve means including a valve member adjustably operable between closed and opened positions to regulate fluid flow through said passage; an armature having an operative connection with said valve member; a spring suspension for said armature and connected valve tuned to vibratingly resonate at a predetermined frequency and normally bias the valve for movement toward a closed position; and an actuating coil operatively associated with said armature to regulate the operating position of said valve and generate said vibrations when electrically energized by a pulsing signal; and means for applying to said armature a pulsing signal varied at the predetermined frequency in accordance with changes in the tool load condition.

7. Electro-hydraulic control means for machine tools, comprising: a workpiece; a tool operative on the workpiece; a fluid pressure actuated power device for relatively moving the work piece and tool; a source of fluid pressure including a fluid flow passage connecting said source with said device, said passage having inlet and outlet ports; valve means including a valve member adjustably operable between closed and opened positions to regulate fluid flow through said passage, said valve having an area acted upon in its closed position by the inlet fluid pressure in a direction to move the valve towards an opened position, and an area subject to outlet fluid pressure in the opened position of said valve acting to move the valve towards a closed position; an armature having an operative connection with said valve member; means normally biasing said armature and connected valve member for movement towards a valve closed position; and an actuating coil operatively associated with said armature energizable to regulate the operating position of said valve in response to variations in an operating condition of said tool.

8. Electro-hydraulic control means for machine tools, comprising: a workpiece; a tool operative on the workpiece; a fluid pressure actuated power device for relatively moving the work piece and tool; a source of fluid pressure; means defining a tubular flow passage connected at one end with an inlet port in communication with said source, and a side wall opening connected with an outlet port in communication with said device; an elongated valve pin longitudinally slidable in said passage to position its inner end margin in flow controlling relation with said side wall opening; a sealed cavity at the other end of said passage; an armature member in said cavity connected with the outer end of said valve pin for unitary movement therewith; spring suspension means resiliently supporting said armature and valve pin for axial movements and acting to urge said valve pin to a balanced position closing said side wall opening; and an actuating coil operatively associated with said armature variably energizable to adjustably regulate the valving position of said valve pin in accordance with an operating condition of said tool.

9. Electro-hydraulic control means for machine tools, comprising; a workpiece; a tool operative on the workpiece; a fluid pressure actuated power device for relatively moving the work piece and tool; a source of fluid pressure; means defining a tubular flow passage connected at one end with an inlet port in communication with said source, and a side wall opening connected with an outlet port in communication with said device; an elongated valve pin longitudinally slidable in said passage to position its inner end margin in a flow controlling relation with said side wall opening; a sealed cavity at the other end of said passage; an armature member in said cavity connected with the other end of said valve pin for unitary movement therewith; spring suspension means resiliently supporting said armature and valve pin for axial movements and acting to urge said valve pin to a balanced position closing said side wall opening, said suspension means being tuned to resonate and vibrate said valve pin and armature at a predetermined frequency; and an actuating coil operatively connected with said armature variably energizable at the predetermined frequency to adjustably regulate the valving position of said valve pin in accordance with an operating condition of said tool.

10. Electro-hydraulic control means for machine tools according to claim 9, wherein a pressure equalizing passageway connects the inlet port with said cavity.

11. Electro-hydraulic control means for machine tools according to claim 9, wherein a passageway connects the outlet port with said cavity.

References Cited by the Examiner
UNITED STATES PATENTS

| | | | |
|---|---|---|---|
| 1,786,755 | 12/1930 | James | 173—7 |
| 1,808,221 | 6/1931 | Hild et al. | 173—7 |
| 2,136,921 | 11/1938 | Joy | 173—7 |
| 2,380,457 | 7/1945 | Maxson | 77—32.7 |
| 2,392,741 | 1/1946 | Hurlburt | 251—129 |
| 2,640,685 | 6/1953 | O'Leary | 173—7 |
| 2,831,650 | 4/1958 | Richardson | 251—129 |
| 2,835,468 | 5/1958 | Sparks | 251—129 |
| 2,916,252 | 12/1959 | Hobbs et al. | 251—129 |

BROUGHTON G. DURHAM, *Primary Examiner.*

L. P. KESSLER, *Assistant Examiner.*